United States Patent [19]

Louw

[11] 4,398,763

[45] Aug. 16, 1983

[54] LOAD CARRIER

[76] Inventor: Franklin S. Louw, P.O. Box 116, Bedfordview, 2008, South Africa

[21] Appl. No.: 280,162

[22] Filed: Jul. 2, 1981

[30] Foreign Application Priority Data

Sep. 3, 1980 [ZA] South Africa .................. 80/5445

[51] Int. Cl.³ .............................................. B60D 3/00
[52] U.S. Cl. ...................................... 296/3; 224/309
[58] Field of Search ................... 296/3, 4, 5, 6, 1, 9,
296/102, 100; 224/309, 310, 314, 320, 321, 330

[56] References Cited

U.S. PATENT DOCUMENTS

| | | | |
|---|---|---|---|
| 2,720,414 | 10/1955 | Hart | 296/3 |
| 2,945,566 | 8/1960 | Tower | 296/3 |
| 3,594,035 | 7/1971 | Ferguson | 224/309 X |
| 3,765,713 | 10/1973 | Suitt | 296/3 |
| 3,933,371 | 1/1976 | Graham | 296/102 |
| 4,057,281 | 11/1977 | Garrett | 296/3 |

*Primary Examiner*—Robert R. Song
*Attorney, Agent, or Firm*—Karl W. Flocks; Sheridan Neimark

[57] ABSTRACT

A load carrier 12 for a motor load vehicle 10 has a rectangular frame 13, four legs 14 depending pivotally from the frame, and feet 16 at the lower ends of the legs. The legs are pivotal about longitudinal axes to allow adjustment in the transverse spacing of the feet 16 so as to fit vehicles having load carrying portion of differing widths.

The frame has longitudinal members 40.1, 40.2 and 40.3. Each longitudinal member is in two parts which are adjustably interconnected by a sleeve 42 to adjust the length of the member, thereby to render the carrier 12 adjustable in length to fit vehicles having load carrying portions of differing lengths.

A rear transverse member 43 can be removed or pivoted out of the way to facilitate loading and offloading from the rear of the vehicle.

10 Claims, 8 Drawing Figures

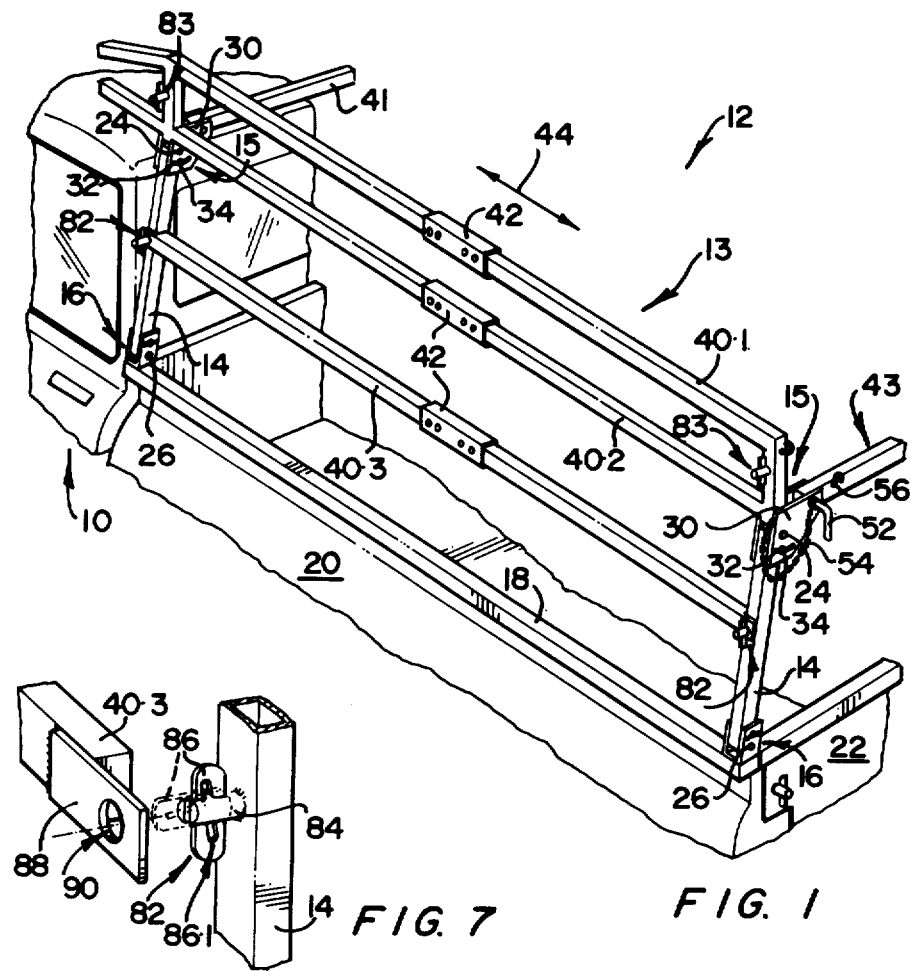
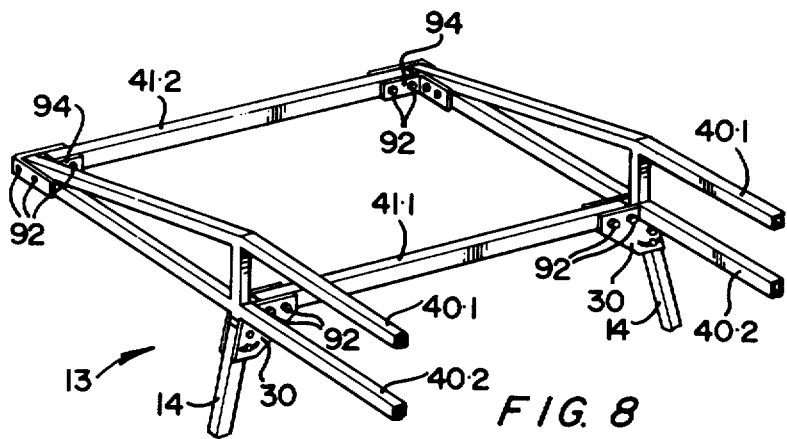

LOAD CARRIER

This invention relates to a load carrier for a motor load vehicle. It relates in particular to a load carrier providing an elevated load-carrying surface over the load-carrying portion of the load vehicle.

In accordance with the invention, there is provided a load carrier for a motor load vehicle, which includes a frame which is substantially rectangular; at least four legs depending pivotally from the frame; and feet at the lower ends of the legs for connection to the body of the load vehicle such that, in use, the frame is supported in an elevated position above the load carrying portion of the load vehicle.

The pivotal connection of the legs to the frame may be about longitudinal axes relative to the direction of travel of the load vehicle so as to permit adjustment in the transverse spacing between the lower ends of the legs. This will permit the carrier to be mounted on load vehicles of differing width.

A foot at the lower end of each leg may include a bracket which is pivotally connected to the lower end of the leg conveniently about a longitudinal axis, the foot having securing means securable to the body of the load vehicle. The bracket may be of U-section, the lower end of the leg being disposed between the limbs of the bracket, the base of the bracket being seatable on the body of the load vehicle.

The frame may comprise longitudinal members extending between the front and rear legs, and which are adjustable in length to adjust the longitudinal spacing between the legs. This will permit the carrier to be mounted on load vehicles of differing length. Conveniently, the adjustability in length of the longitudinal members may be provided by having them telescopic.

The frame may have laterally spaced longitudinal members and longitudinally spaced transverse front and rear members, the transverse rear member being readily movable so as to permit, in use, loading of the vehicle without interference by the rear transverse member of the frame.

In one embodiment, the movability of the transverse rear member may be provided by having it pivotally connected at at least one end to a leg or to a longitudinal member of the frame. The other end will then be removably connected to a leg or longitudinal member at the opposite side of the frame.

In another embodiment the movability of the transverse rear member may be provided by having it in two parts each of which is pivotally connected to a leg or to a longitudinal member, and by having the said rear member including a movable sleeve overlapping the adjacent ends of the said two parts. When in overlapping relationship, the sleeve will interconnect the two parts. To disconnect the two parts to permit them individually to be pivoted out of the way, the sleeve will be moved along one part out of its overlapping arrangement.

The legs and the longitudinal and transverse members may be attachable to the frame and to each other by means of bolts, rivets or pins.

Thus, conveniently, the carrier of the invention may have longitudinal and transverse members, and legs, and bolts, rivets or pins all packed together in kit form.

The invention will now be described by way of example with reference to the accompanying diagrammatic drawings.

In the drawings

FIG. 1 shows a fragmentary oblique rear view of a load carrier according to the invention, mounted on a light delivery van;

FIG. 7 shows, to a larger scale, an oblique view of attachment means of the load carrier of FIG. 1; and FIG. 8 shows, in oblique rear view, the front part of the load carrier of FIG. 1.

Figure 2:
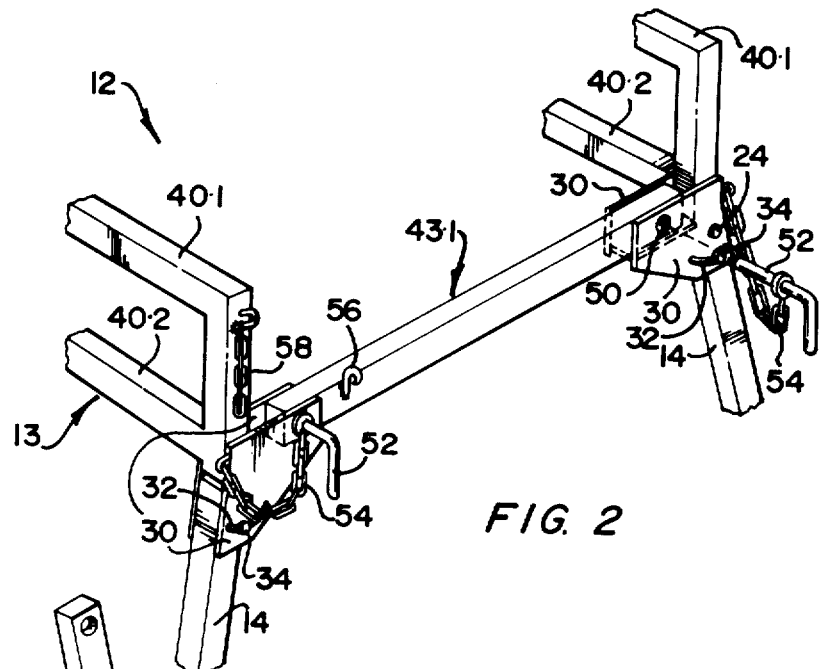
FIG. 2 shows, in fragmentary oblique rear view, one embodiment of a load carrier having a movable transverse rear member.

Referring to FIG. 1 of the drawings, reference numeral 10 refers generally to a light delivery van. A rectangular load carrier 12 according to the invention, having a frame 13 and four legs 14 pivotally depending from the frame 13, is mounted on the rear part of the van 10, via feet 16 at the lower ends of the legs. The feet 16 are mounted on the flanges 18 at the upper ends of the sides 20 of the van 10. The feet 16 of the rear legs 14, are spaced sufficiently apart, so as not to interfere with the opening and closing of the tail gate 22 of the van 10.

The upper ends of the legs 14 are pivotally connected to the underside of the frame 13, via joints 15 having cheekplates 30 and pins 24. The pins 24, whose axes are disposed longitudinally relative to the direction of travel of the van 10, pass through the cheekplates 30, the upper ends of the legs being disposed respectively between pairs of cheekplates 30.

The lower ends of the legs 14 are pivotally connected to the feet 16 via pins 26 whose axes are also disposed longitudinally. A foot 16 is in the form of a U-shaped bracket. The lower end of each leg is disposed between the limbs of the bracket, the base of which is secured to the flange 18, by means of a bolt (not shown) passing through the flange 18.

The feet 16 and the brackets 30 at the upper ends of the legs 14, are all provided with arcuate slots 32 which permit the legs to be locked in a sloping position relative to the frame 13, by means of bolts 34 passing through such arcuate slots 32.

The frame 13 comprises laterally spaced longitudinal members 40.1, 40.2 and 40.3, and front and rear transverse members 41 and 43. The longitudinal members 40.1, 40.2 and 40.3 are each in two parts. Sleeves 42 are provided in overlapping relationship with adjacent ends of the longitudinal members to permit longitudinal adjustment in the length of the frame 13, in the direction of arrow 44.

In practice, the applicant has found that by providing the carrier 12 with the legs 14 pivotally mounted as shown in the drawings, it is possible to have a load carrier, able to fit a large range of sizes of load vehicles having differing widths, even without having the longitudinal adjustment provided by the sleeves 42. In other words, the longitudinal members may be integral units. However, in order to render the carrier even more versatile, so as to permit the fitting of the frame to load vehicles having load carrying portions of differing lengths, the longitudinal adjustment may be provided. Instead of sleeves 42 being provided, the longitudinal members may be arranged to telecope into one another.

With reference now to FIG. 2 of the drawings, there is shown the rear end of a load carrier 12 having one form of a transverse rear member 43.1. The member 43.1 is pivotally connected at either side to the cheekplates 30. The pivotal connection is provided by having pins 52 passing through holes 50 in the cheekplates 30 and through corresponding holes in register in the ends of the member 43.1. The pins 52 are attached to the frame 13 by means of chains 54. A hook 56 is provided on the member 43.1 for use with a chain 58 attached to the frame 13. This is described in more detail with reference to FIG. 3.

Figure 3:
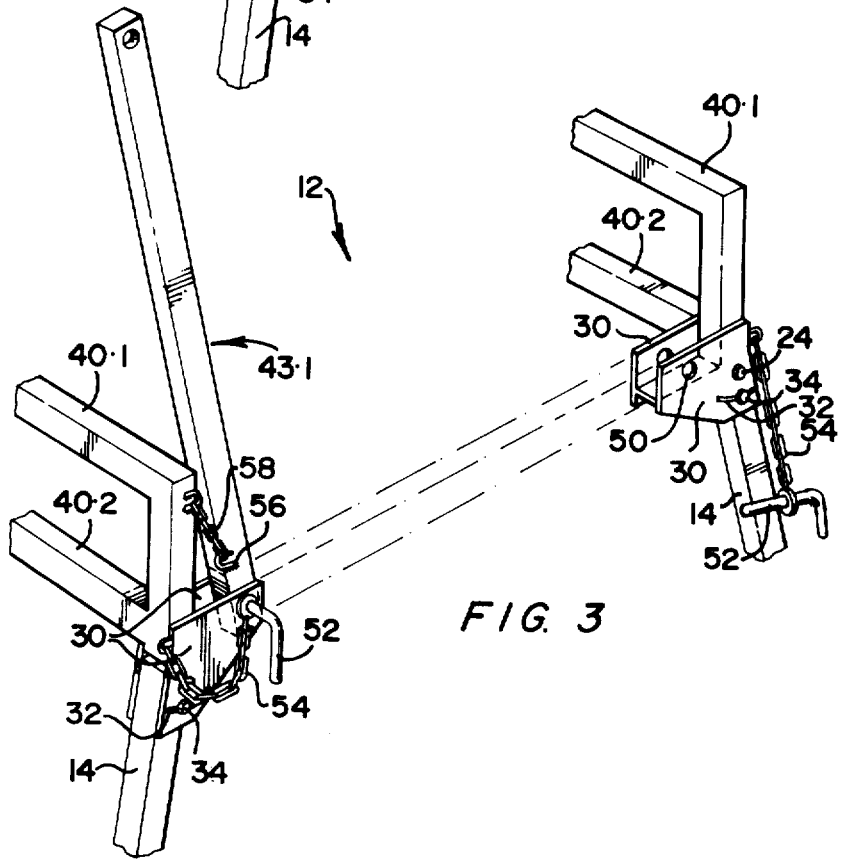
FIG. 3 shows, in a view similar to that of FIG. 2, the transverse rear member of FIG. 2, in a position pivoted upwardly from the position shown in FIG. 2.

With reference also to FIG. 3, to move the member 43.1 out of the way, the pin 52 at the right hand side of the carrier 12, is withdrawn from the hole 50. The corresponding end of the member 43.1 is moved upwardly, the member 43.1 pivoting about an axis provided by the remaining pin 52 on the left hand side of the carrier 12. The hook 56 and the chain 58 co-operate to hold the member 43.1 in its upwardly pivoted position as shown in FIG. 3. In this position, a load vehicle on which the carrier 12 is mounted, can be loaded without interference by the member 43.1.

If desired, the member 43.1 can be removed altogether by removing both pins 52.

Figure 4:
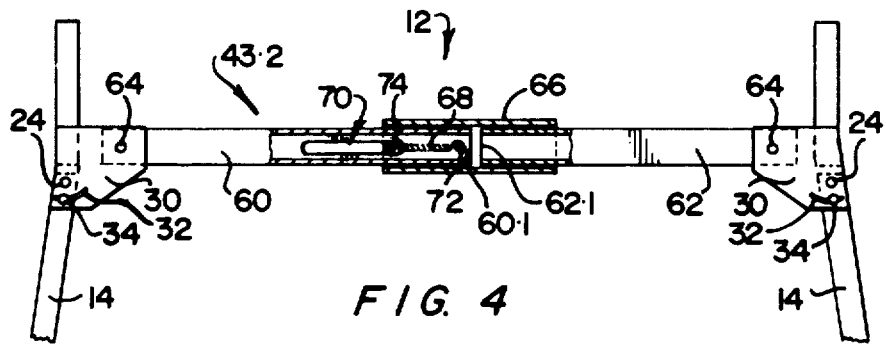
FIG. 4 shows, in fragmentary rear elevation, another embodiment of a load carrier having a movable transverse rear member.
Figure 5:
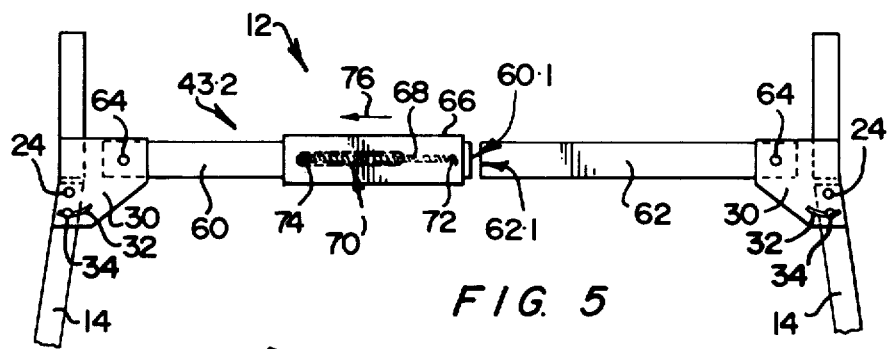
FIG. 5 shows, in a view similar to that of FIG. 4, the load carrier of Figure with a sleeve of the transverse rear member moved sidewardly along the transverse rear member.
Figure 6:
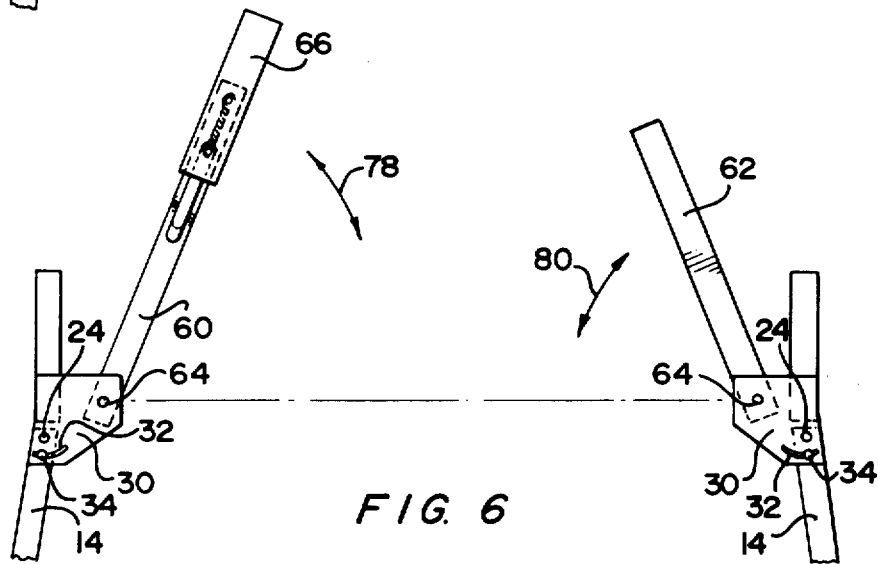
FIG. 6 shows, in a view similar to that of FIG. 4, the load carrier of FIG. 4, with the two parts of the transverse rear member pivoted upwardly from their positions shown in FIGS. 4 and 5.

With reference to FIGS. 4, 5 and 6, another embodiment of a load carrier having a transverse rear member 43.2 in another form is shown.

The member 43.2 is provided in two parts 60 and 62 which are pivotally attached to the cheekplates 30 at their remote ends. Pivotal attachment at each end is provided via pins 64 passing through the cheekplates 30 and the end of the member 43.2.

A sleeve 66 overlaps the adjacent ends 60.1 and 62.1 of the part 60 and 62, thereby interconnecting them. The sleeve 66 is biassed into the overlapping relationship by a spring 68 disposed within the part 60, which is hollow, and acting between a transverse pin 74 fixed to the part 60 and a transverse pin 72 fixed to the sleeve 66 and movable along slots 70 in the part 60.

The sleeve 66 can be moved along the part 60 in the direction indicated by arrow 76 by extending the spring 68. When the sleeve 66 has been moved out of its overlapping relationship, the ends 60.1 and 62.1 are disconnected and can respectively be pivoted upwardly about their pivotal axes provided by the pins 64 as shown by arrows 78 and 80. When thus upwardly pivoted, access to the loading portion of a load vehicle on which the carrier 12 is mounted is allowed without interference by the member 43.2.

With reference to FIG. 7 and FIG. 1, the longitudinal members 40.3 (only one of which is shown) are easily removable by having them detachably attached to the legs 14 by means of quick attachments 82. With reference now to FIG. 7, a quick attachment 82 comprises a stub 84 fast with a leg 14, and an elongated wedging plate 86 movable between a transverse position (shown in solid lines), and a longitudinal position (shown in dotted lines) with respect to the stub 84. The stub 84 has a longitudinally extending diametrical slot along part of its length. A link pin (not shown) bridges the slot and is accommodated in an oblique slot 86.1 in the wedging plate 86, which is held captive by the pin. In its transverse position, the plate 86 is movable downwardly to a wedging position where it is relatively close to the leg 14 and upwardly to a position where it is relatively remote from the leg 14.

The longitudinal member 40.3 has at either end a bracket 88 having a hole 90.

To attach the member 40.3 to the leg 14, the plate 86 is moved to its longitudinal position and passed through the hole 90. The bracket 88 then rests on the stub 84 adjacent the leg 14. To retain the member 40.3 in position, the plate 86 is moved to its transverse position and moved downwardly to wedge the bracket 88 against the leg 14.

To detach the member 40.3 from the legs 14, the above procedure is reversed.

If desired, for example when articles will regularly be loaded onto and unloaded from the load carrying portion of the load vehicle 10 from its side, the members 40.3 may detached from the quick attachments 82, and attached out of the way to the carrier 12 by means of quick attachments 83, similar to the quick attachments 82. When it is desired to enclose the load carrying portion, for example when livestock such as pigs or sheep are transported, the members 40.3 will be attached to the carrier 12 by means of the quick attachments 82. In some embodiments, the members 40.3 may have lateral sub-members and/or grids to close the space between the members 40.2 and flanges 18 more effectively.

With reference to FIG. 8, the frame 13 is shown to have two transverse front members 41.1 and 41.2. The member 41.1 extends between the front legs 14 and the member 41.2 extends between the front ends of longitudinal members 40.1 and 40.2 disposed on either side of the frame 13. The members 41.1 and 41.2 are attached to the longitudinal members 40.1, 40.2 by means of nuts and bolts 92 attaching them respectively to the cheekplates 30 and brackets 94 bolted to the longitudinal members 40.1, 40.2.

By having the longitudinal and transverse members of the carrier 12 detachably attached together as herein described, the carrier 12 can be dismantled and packed in knock-down form, in which it is easily stored or transported.

It is thus an advantage of the invention as described and illustrated that a load carrier can be supplied in kit form and which is adapted to be mounted on load vehicles having loading areas of differing widths, and and even differing lengths.

I claim:

1. A load carrier for a motor load vehicle, the load carrier comprising
    a frame which is substantially rectangular;
    at least four legs depending from the frame, the upper ends of the legs being pivotally connected to the frame about axes disposed longitudinally relative to the intended direction of travel of the motor load vehicle so as to permit stepless adjustment in the transverse spacing between the lower ends of the legs;
    a foot at the lower end of each leg for connection to the body of the motor load vehicle such that, in use, the frame is supported in an elevated position above the load carrying portion of the vehicle; and
    locking means to lock the legs in adjusted positions.

2. A carrier as claimed in claim 1 in which the foot at the lower end of each leg includes a bracket which is pivotally connected about a longitudinal axis to the lower end of its leg, the foot having securing means securable to the body of the load vehicle.

3. A carrier as claimed in claim 2 in which the bracket is of U-section, the lower end of the leg being disposed between the limbs of the bracket, and the base of the bracket being seatable on the body of the load vehicle.

4. A load carrier as claimed in claim 3 in which the locking means for each leg is provided by arcuate slots in the limbs of the respective bracket, and a screw fastener passing through the slots and through the aperture in the leg frictionally to grip the limbs from either side onto sides of the leg to effect locking.

5. A carrier as claimed in claim 1 in which the frame has laterally spaced longitudinal members and longitudinally spaced transverse front and rear members, and in which the transverse rear member is pivotally connected about a longitudinal axis at at least one end to another member of the frame and is upwardly displaceable about said longitudinal axis so as to permit, in use, loading of the vehicle without interference by the rear transverse member of the frame.

6. A carrier as claimed in claim 5 which includes retaining means for retaining the transverse rear member in its upwardly displaced position so as to allow travelling by the vehicle with said transverse rear member in said upwardly displaced position.

7. A carrier as claimed in claim 1 in which the frame has laterally spaced longitudinal members and longitudinally spaced transverse front and rear members, and in which the transverse rear member is in two parts each of which is pivotally connected about a longitudinal axis to another member of the frame, the said rear member including a movable sleeve overlapping the adjacent ends of the said two parts to retain them in an aligned position, the movable sleeve being movable out of overlapping engagement, and the parts being upwardly displaceable about said longitudinal axes so as to permit, in use, loading of the vehicle without interference by said rear member.

8. A carrier as claimed in claim 7 which includes retaining means for retaining the parts of the transverse rear member in their upwardly displaced positions so as to allow travelling by the vehicle with said parts in said upwardly displaced positions.

9. A load carrier as claimed in claim 1 in which each leg is connected to the frame by means of a pair of downwardly and transversely extending cheekplates which are spaced to receive the upper end of the leg therebetween, and a pivot pin passing through the cheek plates and said upper end of the leg.

10. A load carrier as claimed in claim 9 in which there is provided locking means for each leg, the locking means being provided by arcuate slots in the cheekplates and a screw fastener passing through the arcuate slots and through an aperture in the leg frictionally to grip the cheek plates from either side onto sides of the leg to effect locking.

* * * * *